(12) United States Patent
Ohbi

(10) Patent No.: US 8,110,633 B2
(45) Date of Patent: Feb. 7, 2012

(54) SEAL FOR A DISPENSING APPARATUS

(75) Inventor: Daljit Ohbi, Norfolk (GB)

(73) Assignee: Consort Medical PLC, Hemel Hempstead, Hertfordshire (GB)

( * ) Notice: Subject to any disclaimer, the term of this patent is extended or adjusted under 35 U.S.C. 154(b) by 88 days.

(21) Appl. No.: 12/439,922

(22) PCT Filed: Sep. 4, 2007

(86) PCT No.: PCT/GB2007/003323
§ 371 (c)(1),
(2), (4) Date: May 4, 2009

(87) PCT Pub. No.: WO2008/029111
PCT Pub. Date: Mar. 13, 2008

(65) Prior Publication Data
US 2010/0000524 A1 Jan. 7, 2010

(30) Foreign Application Priority Data
Sep. 4, 2006 (GB) .................... 0617375.1

(51) Int. Cl.
C08F 8/00 (2006.01)
C08F 214/26 (2006.01)
C08L 9/00 (2006.01)
C08L 23/00 (2006.01)
C08L 25/02 (2006.01)
C08L 27/10 (2006.01)
C08L 33/00 (2006.01)
C08L 35/00 (2006.01)
C08L 45/00 (2006.01)

(52) U.S. Cl. ........ 525/191; 525/203; 525/209; 525/210; 525/217; 525/232; 525/240; 525/241; 525/445; 525/451; 525/492; 525/515; 525/525

(58) Field of Classification Search .................. 525/191, 525/203, 209, 210, 217, 232, 240, 241; 524/445, 524/451, 492, 515, 525
See application file for complete search history.

(56) References Cited

U.S. PATENT DOCUMENTS

| | | | |
|---|---|---|---|
| 2003/0194575 A1 | 10/2003 | Tau et al. | |
| 2003/0195299 A1 | 10/2003 | Stevens et al. | |
| 2004/0087751 A1 | 5/2004 | Tau et al. | |
| 2004/0129737 A1 | 7/2004 | Anderson et al. | |
| 2006/0183861 A1 | 8/2006 | Harrington et al. | |
| 2008/0230567 A1* | 9/2008 | Ohbi | 222/402.24 |

FOREIGN PATENT DOCUMENTS

| | | |
|---|---|---|
| EP | 1591482 A1 | 11/2005 |
| FR | 2855829 A1 | 12/2004 |
| GB | 2410500 A | 8/2005 |
| WO | 97/01611 A | 1/1997 |
| WO | 2006092618 A1 | 9/2006 |

OTHER PUBLICATIONS

International Search Report, PCT/GB2007/003323, dated Nov. 12, 2007, 3 pages.
Written Opinion, PCT/GB2007/003323, dated Nov. 12, 2007, 6 pages.

* cited by examiner

*Primary Examiner* — Nathan M Nutter
(74) *Attorney, Agent, or Firm* — Senniger Powers LLP

(57) ABSTRACT

A seal for a valve for use in a pharmaceutical dispensing device, which seal is formed from a blend comprising: a thermoplastic elastomer including a propylene component with isotactic crystallinity; and a polymer selected from one or more of polypropylene, polyethylene and copolymers thereof.

29 Claims, 3 Drawing Sheets

SEAL FOR A DISPENSING APPARATUS

The present invention relates to a seal material and, in particular, to a seal material comprising a blend containing a polyolefin thermoplastic elastomer. The seal may be used for dispensing pressurised fluid in the form of an aerosol. The seal is particularly suitable for use in pressurised metered dose aerosol inhaler devices (pMDIs) and in medical check devices suitable for dispensing a pharmaceutical. The seal may be used also in pumps and nasal delivery devices. Other examples include dry powder inhalers, syringe seals, stoppers for medicinal containers, pump seals, and the connecting strap and/or dust cap for an oral or nasal actuator.

It is known from GB 1201918 for example to provide dispensing apparatus in which pressurised fluid from a pressurised dispensing container is released by a valve in a controlled manner, the valve including elastomeric seals which are annular and which co-operate with a sliding valve stem to open and close fluid ports. FR-A-2,549,568, WO95/02651 and GB 2,148,912 and PCT/GB96/01551 each disclose further examples of such dispensing apparatus.

The required material properties necessary for good seal performance for pharmaceutical applications include: chemical compatibility (swell), tensile strength, permanent compression set, stress relaxation, elastic modulus, regulatory compliance, low permeability to fluids and gases, low levels of extractables and leachables, and stable properties after extraction.

Accordingly, as well as the requirement for good engineering properties, there is a requirement for sanitary properties, including low levels of extractables and leachables, which might otherwise increase impurities of drug products to unacceptable levels, as well as potentially reacting with the drug product, vehicle or excipients. In this connection, products to be dispensed by the pMDI are commonly provided in solution or suspension in an alcohol base, this being particularly common in the dispensing of medicinal compounds for inhalation therapy.

The metering valves used in dispensing devices such as pMDIs are typically constructed from a mixture of metal and/or thermoplastic parts and elastomeric rubber parts. The seal itself typically comprises an elastomer such as a synthetic rubber, for example, nitrile rubber.

It is known from WO 00/40479 to use a two-phase elastomeric alloy material for a regulating member in an aerosol valve and flow regulator assembly.

The benefits of using "alloyed" or "blended" materials include high elasticity and low hardness. For example, favourable values of elasticity and Shore Hardness (A) can be achieved when a softer elastomeric component is dispersed in a matrix of a thermoplastic material.

The production of seals comprising elastomeric materials typically involves steps for the curing/cross-linking of natural and synthetic rubbers. Accelerators are compounds which reduce the time required for curing/cross-linking of natural and synthetic rubbers. Examples include sulphur-based compounds. Accelerators may also act to improve the non-permeability characteristics and other physical properties of the rubber.

Peroxides such as dicunyl peroxide can also be used to cure elastomers. However, the curing reaction can be variable and this may affect the material properties; in extreme cases, the material can become brittle. Moreover the products of the reaction have to be removed as they can deteriorate elastomer properties, for example ageing. Another problem is that peroxides are deactivated by antioxidants. Antioxidants are often required to enhance the ageing properties of the elastomer.

The pMDI devices containing propellant and drug mixtures are pressurised at ambient temperatures typically up to 5 bar (500 kPa). Under these conditions the residual by-products from the curing/cross-linking reaction can migrate out and interfere with the drug mechanisms.

Accordingly, in most pharmaceutical applications it is also necessary to extract or wash the cured elastomer in order to remove surface residues and by-products resulting from the cure reaction and moulding process. Examples include ethanol and super-critical fluid extraction. Prolonged extraction times have been found, however, to result in a deterioration in material properties. Moreover, extraction processes add to production costs.

It is an object of the present invention to provide a seal material for a dispensing apparatus which addresses at least some of the problems associated with the prior art.

Accordingly, in a first aspect, the present invention provides a seal formed from a blend comprising:
 a thermoplastic elastomer including a propylene component with isotactic crystallinity; and
 a polymer such as polypropylene or polyethylene or copolymers thereof.

Figure 1:
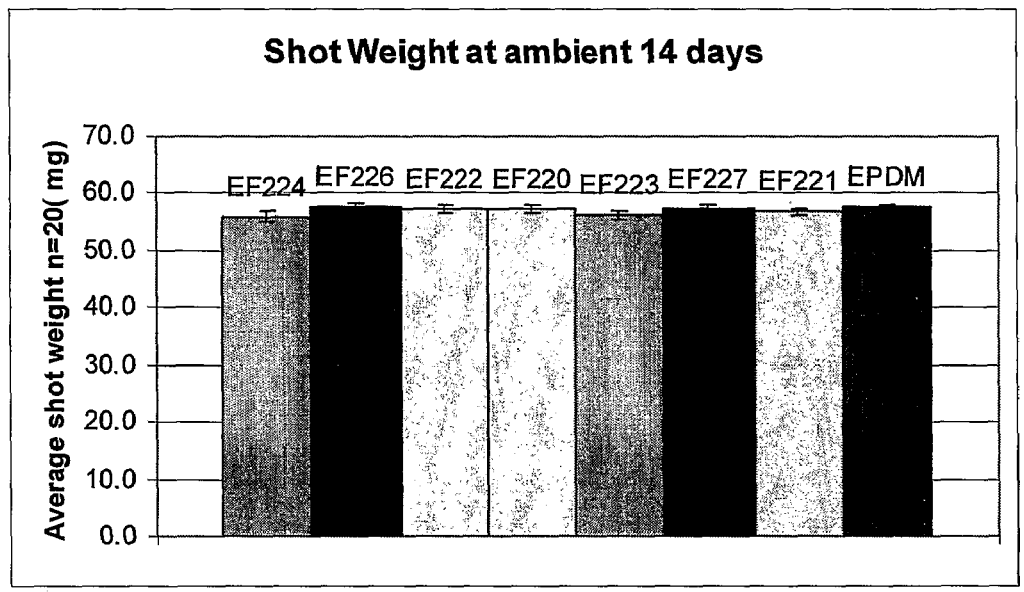
FIG. 1 is a graph illustrating shot weight performance of compositions of the invention.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The seal according to the present invention is formed from a material comprising a polyolefin thermoplastic elastomer with isotactic propylene crystallinity.

The term seal as used herein is intended to encompass any sealing member or portion thereof present in a pharmaceutical dispensing device, including, but not limited to, gaskets, seats and seals, whether static or dynamic.

It will be appreciated that the seal may be provided as a separate component or may be formed integrally with the valve, i.e. be co-moulded.

The polyolefin thermoplastic elastomer preferably comprises a copolymer or terpolymer of propylene and one or more alpha-olefins. The alpha-olefin is preferably selected from one or more of ethylene, butene, hexene, octene, and decene.

The polyolefin thermoplastic elastomer preferably comprises propylene with from 2 to 25% isotactic crystallinity, more preferably from 5 to 15% isotactic crystallinity, still more preferably from 5 to 10% isotactic crystallinity.

The polyolefin thermoplastic elastomer preferably comprises at least 80% propylene co-monomer, more preferably at least 85% propylene co-monomer. The polyolefin thermoplastic elastomer is preferably semi-crystalline.

The polyolefin elastomer preferably has a molecular weight (Mw) of at least 100,000, more preferably at least 130,000. The Mw/Mn is preferably from 1.5 to 2.5, more preferably approximately 2.

The polyolefin elastomer typically exhibits a peak crystalline melting temperature (measured by DSC) of 40 to 80° C., more typically 50 to 70° C.

The preferred polyolefin elastomer comprises a copolymer of propylene and other alpha-olefins, preferably one of which is ethylene. The ratio of propylene is at least 80%.

The isotactic propylene is preferably a linear-substituted hydrocarbon polymer in which all or substantially all of the substituent groups lie on the same side of the carbon chain. The polymer is preferably highly stereo-regular.

Semicrystalline co- and ter-polymers of propylene and other alpha-olefins are preferred, preferably containing at least 80% propylene with isotactic stereochemistry. The polymer preferably exhibits a substantially uniform intermolecular/intramolecular distribution of composition and crystallinity.

A preferred example of the polyolefin elastomer is Vistamaxx®, which is manufactured by the Exxon Mobil Chemical Company. A polyolefin elastomer is also available from Dow under the name Versify®.

The thermoplastic elastomer is preferably present in the blend in an amount of from 5 to 95 wt. %, more preferably 5 to 90 wt. %, still more preferably 50 to 90 wt. %

In the present invention, the aforementioned polyolefin thermoplastic elastomer is combined or blended with a separate polymer. The polymer is preferably selected to increase the peak crystalline melting point of the blend. The polymer will typically have a peak crystalline melting point that is greater than the peak crystalline melting point of the thermoplastic elastomer.

The polymer will typically have a molecular weight that is greater than the molecular weight of the thermoplastic elastomer.

The addition of the polymer has been found to improve the characteristics of the seal in pressurised metered dose aerosol inhaler devices (pMDIs). In particular, the shot weight and leakage characteristics. While not wishing to be bound by theory, it is believed that the improvements are linked to an increase in the peak crystalline melting point of the blend.

Accordingly, the blend advantageously exhibits a peak crystalline melting temperature (measured by DSC) greater than 65° C., preferably greater than 75° C., more preferably greater than 85° C.

The polymer is preferably selected from one or more of polypropylene and polyethylene, including copolymers and terpolymers thereof. If the polymer comprises polypropylene (or a copolymer or terpolymer thereof), then it will be appreciated that it is not the same as the thermoplastic elastomer.

Preferred polymers for use in the blend according to the present invention include crystalline polypropylene, polypropylene copolymers, LDPE and HDPE.

The polymer is preferably present in the blend in an amount of from 2 to 30 wt. %, more preferably 2 to 15 wt. %, still more preferably 5 to 15 wt. %.

A preferred example of a polymer for use in the present invention is a polypropylene homopolymer such as Moplen H483R, which is manufactured by Basell.

Other examples of suitable polymers include: random copolymer polypropylenes such as Innovene 200-OA25, which is manufactured by BP; Riblene MR10 LDPE, which is manufactured by Polimeri Europa; and Purell GA7760 HDPE, which is manufactured by Basell.

The blend may further comprise EVA, for example Elvax 660 EVA (12% vinyl acetate), which is manufactured by DuPont. The EVA may be present in the blend in an amount of from 1 to 20 wt. %, more preferably 1 to 10 wt. %.

The inventors have found that a copolymer or terpolymer of propylene and an alpha-olefin can effectively be used in alloys or blends with other polymers and/or fillers to produce materials that function as effective sealing materials in pMDI devices. Accordingly, the seal material may also further comprise one or more additional thermoplastic components such as, for example, polymers selected from styrene-ethylene-ethylene-propylene, styrene-ethylene-propylene, styrene-butadiene-styrene, polyether block polyamide, polyether-polyester, ethylene-diene, polydimethylsiloxane/urea copolymers, and/or cyclo-olefin copolymers, including combinations of two or more thereof. The one or more additional thermoplastic components is/are typically present in the seal material in an amount of from 1 to 40 wt. %, preferably from 1 to 10 wt. %, still more preferably from 1 to 5 wt. %.

The weight ratio of the one or more additional thermoplastic components to the polyolefin thermoplastic elastomer is preferably in the range of from 1:99 to 40:60.

The seal material preferably further comprises a mineral and/or inorganic filler. Mineral fillers are preferable to carbon black in order to minimise the formation of polynuclear aromatic hydrocarbon compounds. Suitable examples include any of magnesium silicate, aluminium silicate, aluminium oxide, hydrated aluminium oxide, barium sulphate, Wollastonite, inorganic and organic fibrous fillers, inorganic and organic micro-spheres, silica, titanium oxide, zinc oxide, calcium carbonate, magnesium oxide, hydrated magnesium oxide, magnesium carbonate, magnesium aluminium silicate, aluminium hydroxide, talc, kaolin and clay, including combinations of two or more thereof. The filler may be coated with one or more coupling agents, for example silanes, titanates and zirconates.

Preferably, the filler is or comprises one or more of magnesium silicate, talc, calcined clay, nano particle clays, kaolin and/or amino silane coated clay or clay coated with a titanium or zirconate coupling agent. The filler is typically present in the seal material in an amount of from 1 to 40 wt. %, preferably from 1 to 30 wt. %, more preferably from 1 to 20 wt. %, still more preferably from 1 to 10 wt. %.

The seal material preferably comprises both an additional thermoplastic component as herein described and a mineral/inorganic filler as herein described. The polymer alloys, mixtures or blends may be produced by conventional methods, for example using a twin-screw mixer extruder or by injection moulding. Thus, the seal may be produced by a process involving: providing a composition comprising a polyolefin thermoplastic elastomer with propylene crystallinity, the said polymer component, and optionally one or more additional thermoplastic components and optionally one or more fillers as herein described; and forming the composition into a seal. In this process the step of forming the composition into a seal may involve one or more forming techniques such as compression moulding, injection moulding and/or extrusion. The seal material according to the present invention lends itself particularly to injection moulding and this is advantageous because it reduces manufacturing cycle times from minutes (6-10 minutes for compression/transfer moulding) to seconds (15-25 seconds for injection moulding). Injection moulding also results in reduced process waste compared to compression/transfer processes. The seal can also be co-moulded if desired with thermoplastics such as PBT, nylon and/or polyacetal.

The inventors have found that alloying or blending of semicrystalline propylene co- or ter-polymers with inorganic/mineral fillers and/or thermoplastic components has yielded compositions with elastomeric properties suitable for sealing applications in pharmaceutical applications. It has surprising been found that this can be achieved without the use of plasticisers or processing aids or compatibilising agents, which are typically required for producing alloys/blends. Thus, the present invention enables a seal material to be produced that is essentially free of a cross-linking agent if desired. The seal material may also be essentially free of a plasticizer. The seal material may also be essentially free of a processing aid. The seal material may also be essentially free of a compatiblising agent.

In a preferred embodiment, the present invention provides a seal for a valve for use in a pharmaceutical dispensing device, which seal is formed from a material consisting of or consisting essentially of:
- a polyolefin thermoplastic elastomer including a propylene component with semi-crystallinity, preferably a copolymer of propylene and an alpha-olefin;
- a polymer selected from one or more of polypropylene, polyethylene and copolymers thereof;
- optionally one or more additional thermoplastic components as herein described; and optionally one or more mineral and/or inorganic fillers as herein described; and
any unavoidable impurities.

The seal material according to the present invention is very clean having extractable levels of typically 8 to 500 ppm (by GC-MS).

The seal material according to the present invention also has good sealing characteristics, which are comparable to those of conventional EPDM and nitrile elastomers. Surprisingly the elastomeric properties of the seal material are maintained at elevated conditions, for example 40° C./75% RH.

Although not essential, if desired, the seal material may further comprise any of a reinforcement agent, processing aid, a plasticizer, a binder, a stabilizer, a retarder, a bonding agents, an antioxidant, a lubricant, a pigment, a wax, a resin, an antiozonants, a secondary accelerator or an activator, including combinations of two or more thereof. Examples of antioxidants are 2:2'-methylene-bis(6-(1-methyl-cyclohexyl)-para-creosol) and octylated diphenylamine.

As mentioned above, a benefit of using a seal in accordance with the present invention in a pharmaceutical dispensing device is the relatively low levels of leachables and extractables that are present. Thus, while seals prepared according to the present invention may be ethanol extracted (i.e. washed by refluxing ethanol) to reduce the level of any leachable species that could migrate into drug mixtures, this step is not essential and can be dispensed with. This is in contrast to conventional thermoset rubbers, which do require an ethanol extraction. As mentioned above, the seal material according to the present invention has extractible levels of typically 8 to 500 ppm (by GC-MS). It will be appreciated that the extractible levels may be further reduced, if required, by performing an extraction step.

The seal according to the present invention may be used in a valve for use in a dispensing device, such as a pharmaceutical dispensing device. Specific examples include a nasal, pulmonary or transdermal delivery device. Preferred uses of the seal are in a pressurised metered dose aerosol inhaler device and in a medical check device suitable for dispensing a pharmaceutical. Other examples include dry powder inhalers, syringe seals, stoppers for medicinal containers, and pump seals.

The term pharmaceutical as used herein is intended to encompass any pharmaceutical, compound, composition, medicament, agent or product which can be delivered or administered to a human being or animal, for example pharmaceuticals, drugs, biological and medicinal products. Examples include antiallergics, analgesics, bronchodilators, antihistamines, therapeutic proteins and peptides, antitussives, anginal preparations, antibiotics, anti-inflammatory preparations, hormones, or sulfonamides, such as, for example, a vasoconstrictive amine, an enzyme, an alkaloid, or a steroid, including combinations of two or more thereof. In particular, examples include isoproterenol [alpha-(isopropylaminomethyl) protocatechuyl alcohol], phenylephrine, phenylpropanolamine, glucagon, adrenochrome, trypsin, epinephrine, ephedrine, narcotine, codeine, atropine, heparin, morphine, dihydromorphinone, ergotamine, scopolamine, methapyrilene, cyanocobalamin, terbutaline, rimiterol, salbutamol, flunisolide, colchicine, pirbuterol, beclomethasone, orciprenaline, fentanyl, and diamorphine, streptomycin, penicillin, procaine penicillin, tetracycline, chlorotetracycline and hydroxytetracycline, adrenocorticotropic hormone and adrenocortical hormones, such as cortisone, hydrocortisone, hydrocortisone acetate and prednisolone, insulin, cromolyn sodium, and mometasone, including combinations of two or more thereof.

The pharmaceutical may be used as either the free base or as one or more salts conventional in the art, such as, for example, acetate, benzenesulphonate, benzoate, bircarbonate, bitartrate, bromide, calcium edetate, camsylate, carbonate, chloride, citrate, dihydrochloride, edetate, edisylate, estolate, esylate, fumarate, fluceptate, gluconate, glutamate, glycollylarsanilate, hexylresorcinate, hydrobromide, hydrochloride, hydroxynaphthoate, iodide, isethionate, lactate, lactobionate, malate, maleate, mandelate, mesylate, methylbromide, methylnitrate, methylsulphate, mucate, napsylate, nitrate, pamoate, (embonate), pantothenate, phosphate, diphosphate, polygalacturonate, salicylate, stearate, subacetate, succinate, sulphate, tannate, tartrate, and triethiodide, including combinations of two or more thereof. Cationic salts may also be used, for example the alkali metals, e.g. Na and K, and ammonium salts and salts of amines known in the art to be pharmaceutically acceptable, for example glycine, ethylene diamine, choline, diethanolamine, triethanolamine, octadecylamine, diethylamine, triethylamine, 1-amino-2-propanol-amino-2-(hydroxymethyl)propane-1,3-diol, and 1-(3,4-dihydroxyphenyl)-2 isopropylaminoethanol.

The pharmaceutical will typically be one which is suitable for inhalation and may be provided in any suitable form for this purpose, for example as a powder or as a solution or suspension in a solvent or carrier liquid, for example ethanol.

The pharmaceutical may, for example, be one which is suitable for the treatment of asthma. Examples include salbutamol, beclomethasone, salmeterol, fluticasone, formoterol, terbutaline, sodium chromoglycate, budesonide and flunisolide, and physiologically acceptable salts (for example salbutamol sulphate, salmeterol xinafoate, fluticasone propionate, beclomethasone dipropionate, and terbutaline sulphate), solvates and esters, including combinations of two or more thereof. Individual isomers such as, for example, R-salbutamol, may also be used. As will be appreciated, the pharmaceutical may comprise of one or more active ingredients, an example of which is flutiform, and may optionally be provided together with a suitable carrier, for example a liquid carrier. One or more surfactants may be included if desired.

According to a second aspect, the present invention also provides a pharmaceutical dispensing device having a valve as herein described. The pharmaceutical dispensing device may be, for example, a nasal, pulmonary or transdermal delivery device. Preferred devices are a pharmaceutical metered dose aerosol inhaler device and a medical check device.

The present invention also provides a dispensing apparatus for dispensing pressurised fluid comprising a valve body defining a chamber, a valve member extending movably through the chamber and through at least one annular seal co-operating with the valve member and the body to regulate the discharge of fluid, wherein the or at least one of the seals is as herein described with reference to the first aspect of the invention.

Such a device may be used for dispensing medicine, pharmaceuticals, biological agents, drugs and/or products in solution or suspension as herein described.

In a preferred embodiment, the dispensing apparatus comprises a pressurised dispensing container having a valve body provided with two annular valve seals through which a valve member is axially slidable, the seals being disposed at inlet and outlet apertures of a valve chamber so that the valve functions as a metering valve.

The dispensing apparatus as herein described may comprise a pressurised dispensing container operatively connected to the valve body and containing the fluid to be dispensed and a hydrofluorocarbon propellant comprising propellant type 134a or 227. The designation of propellant types referred to in the present application is as specified in British Standard BS4580:1970 "Specification for number designations of organic refrigerants". Accordingly, propellant 134a is: 1,1,1,2-tetrafluoroethane CH2F-CF3 and propellant 227 is: 1,1,1,2,3,3,3 heptafluoropropane CF3-CHF-CF3.

The fluid to be dispensed typically comprises a liquid or particulate product as a solution or suspension in a carrier liquid. The carrier liquid preferably comprises an alcohol such as ethanol. One or more surfactants may be present.

In the dispending apparatus according to the present invention, the seal material as herein described may be used for all the gaskets/seals. Alternatively, the seal material as herein described may be used for the gasket or for the dynamics seal and the other seal may be a conventional synthetic rubber such as, for example, EPDM, nitrile, bromobutyl, butyl, chlorobutyl and neoprene.

The material as described herein for use in the present invention may also be used for the strap connecting a dust cap for an oral or nasal actuator and/or for the dust cap itself. Accordingly, in a further aspect, the present invention provides a dust cap for an oral or nasal actuator, said dust cap being formed from a blend comprising:
  a thermoplastic elastomer including a propylene component with isotactic crystallinity; and
  a polymer such as polypropylene or polyethylene or copolymers thereof. In yet a further aspect, the present invention provides a strap for connecting a dust cap to an oral or nasal actuator, said strap being formed from a blend comprising:
  a thermoplastic elastomer including a propylene component with isotactic crystallinity; and
  a polymer such as polypropylene or polyethylene or copolymers thereof.

The preceding passages in relation to the first and second aspects of the invention are also applicable, either individually or in combination, to these further aspects. In particular, any feature indicated as being preferred or advantageous in relation to the blend described herein is also applicable to the dust cap and/or connecting strap. It will be appreciated that both the cap and the connecting strap may be formed from a blend as described herein. Furthermore, the cap and the connecting strap may be formed from the same blend of material.

The aforementioned blend gives sufficient rigidity for the main part of the cap which covers the mouthpiece enabling the cap to be gripped and easily removed while maintaining its shape for ease of fitting to the mouthpiece. At the same time, the material is sufficiently elastic to enable the strap to be elongated allowing the more rigid cap to be fitted over the mouthpiece of the actuator. By making the strap relatively thin, elongation can be induced as desired. By making the cap part thicker, it can be made semi-rigid (relative to the strap). Since the main body of an actuator is usually made of polypropylene, owing to its modest cost and low extractibles, it is possible to co-mould the dust cap and/or strap to the main body.

EXAMPLES AND FIGURES

The present invention will now be described further with reference to the following non-limiting examples in the Tables and Figures.

Tables 1 and 2 list a number of thermoplastic elastomer compositions in accordance with the present invention. 'Vistamaxx' and 'Versify' are used as the thermoplastic elastomer component in these examples. The Vistamaxx polymers are manufactured by ExxonMobil and Versify is manufactured by the Dow Chemical Company.

Other components in Table 1 are as follows:
the talc is "Mistron Vapor R10C";
the polypropylene (PP) homopolymer is Moplen 483R, manufactured by Basell;
the random copolymer of propylene (PP) and ethylene (PE) is Innovene 200-CA25, manufactured by BP;
the low density polyethylene (LDPE) is Riblene MR10, manufactured by Polimeri Europa;
the high density polyethylene is Purell GA7760, manufactured by Bassell;
the ethylene vinyl acetate (EVA) polymer is Elvax 660, manufactured by DuPont.

Table 3 shows the peak crystalline melting temperature (Tpc) of the compositions defined in Tables 1 and 2. This information was obtained by DSC. Vistamaxx 1100 by itself shows a peak crystalline melting temperature of 60.3° C. It is noted that all the samples display a peak crystalline melting temperature of greater than that of Vistamaxx by itself.

The addition of, for example, crystalline PP, PP copolymer, LDPE and/or HDPE increases the peak crystalline melting point of the blends. Increase in the peak crystalline melting point have been found to increase the service temperature stability of the seals according to the present invention. In particular, the seals exhibit elastomeric behavior at higher temperatures and, as a consequence, offer stable shot weight and low leakage in dispensing devices such as MDIs.

The performance of seal blends according to the present invention in an MDI valve using 134a+5% ethanol has been assessed. The shot weight performance at ambient is very consistent and comparable to thermoset EPDM control (see FIG. 1).

Figure 2:
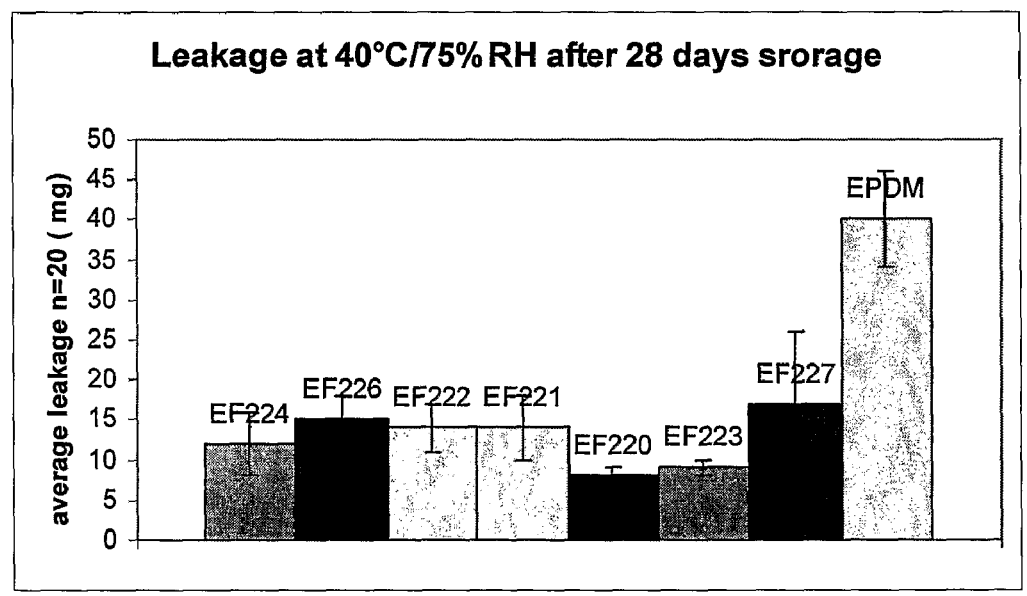
FIG. 2 is a graph illustrating leakage characteristics of compositions of the invention.

The shot weight performance of the blends 40° C./75% RH is also very consistent and comparable to the thermoset EPDM control (see FIG. 2).

Figure 3:
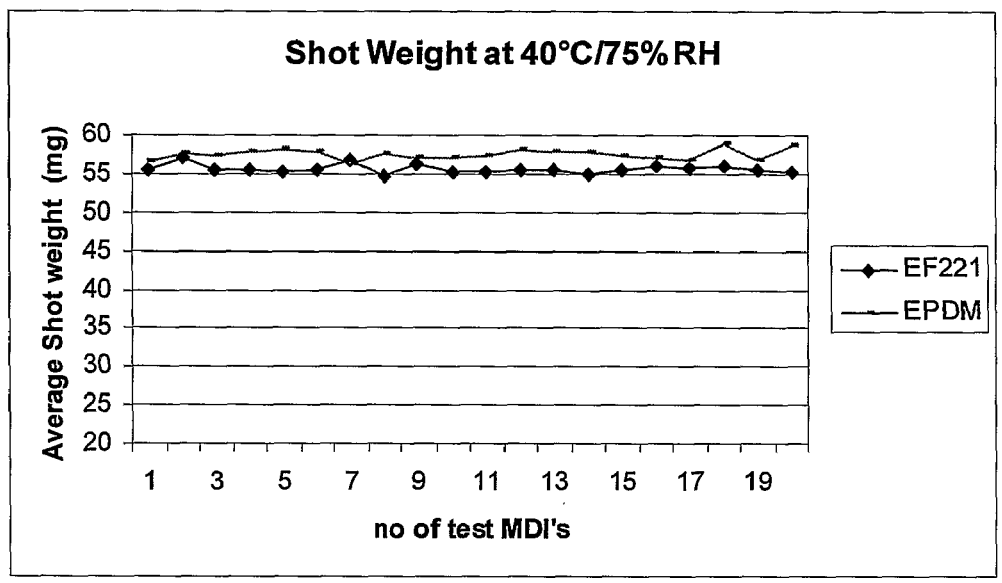
FIG. 3 is a graph illustrating shot weight performance of a composition of the invention.
Figure 4:
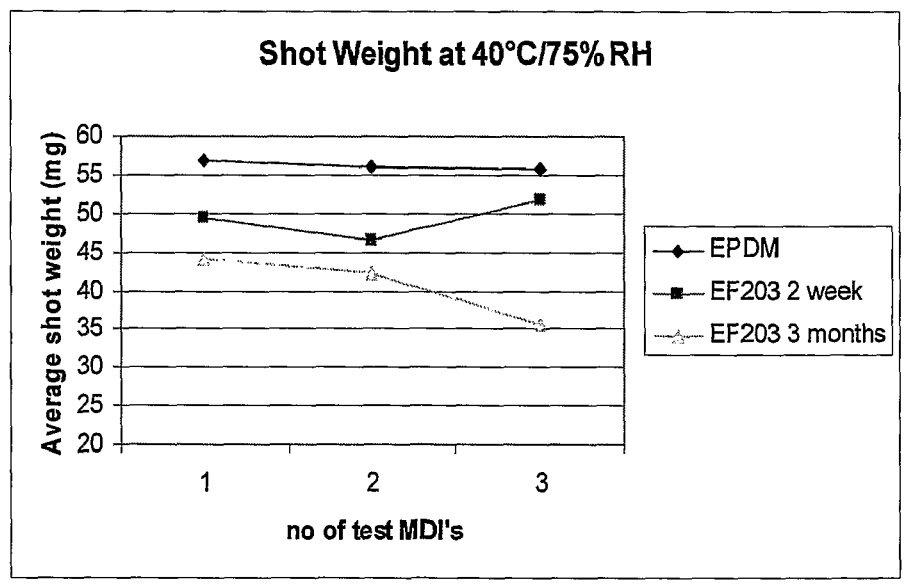
FIG. 4 is a graph illustrating shot weight performance of composition EF203.

The effect of crystalline component in improving the thermal stability of the blends is further shown in FIGS. 3 and 4. EF221 is an alloy of Vistamaxx 1100 with isotactic PP (Moplen 483R) and 30 parts talc. Its shot weight at 40° C./75% RH is consistent and comparable to thermoset EPDM (see FIG. 3). Sample EF203 is an alloy of Vistamaxx 1100 with 30 parts talc. Its shot weight is inconsistent compared to thermoset EPDM. This is thought to be due to its relatively poor thermal stability (see FIG. 4).

Figure 5:
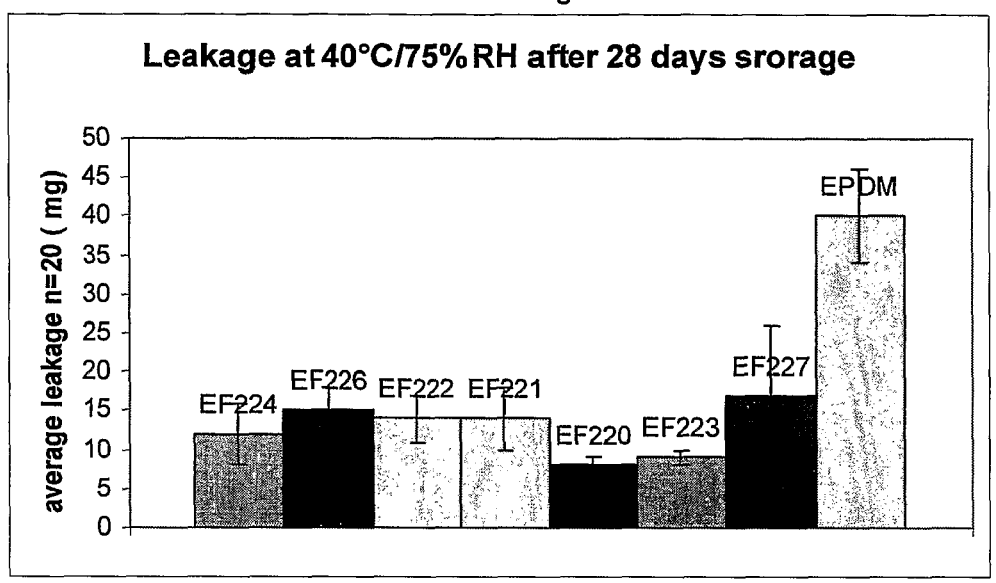
FIG. 5 is a graph illustrating leakage characteristics of compositions of the invention.

The leakage characteristics of seal blends according to the present invention is superior to EPDM at both ambient and 40° C./75% RH conditions (see FIG. 5).

The effect of removing talc on the peak crystalline melting temperature of sample EF 221 is examined in Table 4. Specifically, the relative amounts of Vistamaxx 1100 and polypropylene are kept the same, and simply the total amount of talc is reduced. It is seen that simply blending the thermoplastic elastomer Vistamaxx with a suitable polypropylene increases the peak crystalline melting temperature of the sample. Adding talc further increases the value.

The effect of crystalline component on the shot weights at 40° C./75% RH of EF221 is examined in Table 5. EF203 (Vistamaxx 1100 with 30 parts talc) and thermoset EPDM are provided by way of comparison. Results show that addition of crystalline component to EF221 improves its thermal stability.

TABLE 1

Examples of compositions according to the present invention

| | Sample | | | | | | | | | | | | | | |
|---|---|---|---|---|---|---|---|---|---|---|---|---|---|---|---|
| | 216 | 217 | 218 | 219 | 220 | 221 | 222 | 223 | 224 | 225 | 226 | 227 | 228 | 229 | 230 |
| Vistamaxx 2100 | 90 | 90 | 90 | 90 | 90 | | | | | | | | | | |
| Vistamaxx 1100 | | | | | | 90 | 90 | 90 | 90 | 90 | 90 | 90 | 90 | 90 | 90 |
| Talc | 20 | 20 | 20 | 20 | 20 | 30 | 30 | 30 | 30 | 30 | 60 | 60 | 60 | 60 | 60 |
| PP | 10 | | | | | 10 | | | | | 10 | | | | |
| PP/PE copolymer | | 10 | | | | | 10 | | | | | 10 | | | |
| LDPE | | | 10 | | | | | 10 | | | | | 10 | | |
| HDPE | | | | 10 | | | | | 10 | | | | | 10 | |
| EVA | | | | | 10 | | | | | 10 | | | | | 10 |

TABLE 2

Examples of compositions according to the present invention

| | Sample | | | | |
|---|---|---|---|---|---|
| | 231 | 232 | 233 | 234 | 235 |
| Versify 3200.01 | 90 | 90 | 90 | | |
| Versify 3000.01 | | | | 90 | 90 |
| Talc | 20 | 30 | 50 | 20 | 30 |
| PP | | 10 | | | 10 |
| PP/PE | | | | | |
| LDPE | | | 10 | | |
| HDPE | 10 | | | 10 | |

TABLE 3

The peak crystalline melting temperature of the compositions defined in Tables 1 and 2.

| Sample | Tpc ° C. |
|---|---|
| 216 | 115.45 |
| 217 | 109 |
| 218 | 104 |
| 219 | 77, 102 |
| 220 | 77.9 |
| 221 | 112 |
| 222 | 105 |
| 223 | 60, 86 |
| 224 | 72.6 |
| 225 | 77.6, 98 |
| 226 | 113 |
| 227 | 109 |
| 228 | 57, 84, 99 |
| 229 | 83.7 |
| 230 | 77, 98, 120 |
| 231 | 78, 116 |
| 232 | 103 |
| 233 | 66 |
| 234 | 87, 115 |
| 235 | 110 |

TABLE 4

The peak crystalline melting temperature of sample 221 with varying amounts of talc added.

| Sample | Filler content (% by weight) | Tpc |
|---|---|---|
| Vistamaxx 1100 | 0 | 60.3 |
| 221A | 0.0 | 95 |
| 221B | 9.1 | 108.8 |
| 221C | 16.7 | 109.6 |
| 222 | 30 | 112 |

TABLE 5

The effect of the crystalline component on the shot weights at 40° C./75% RH of EF221. EF203 is compared with thermoset EPDM.

| Alloy/ Storage time | Shot weight at 40° C./75% RH | | | |
|---|---|---|---|---|
| | Mean (mg) | Max (mg) | Min (mg) | S.D |
| EPDM 1 month | 56 | 58.2 | 55.2 | 0.7 |
| EF221 1 month | 55.6 | 57.2 | 54.6 | 0.6 |
| EF203 2 weeks | 49.2 | 51.7 | 46.62 | 2.55 |
| EF203 3 months | 40.5 | 44.02 | 35.50 | 4.48 |

The invention claimed is:

1. A seal for a valve for use in a pharmaceutical dispensing device, which seal is formed from a blend comprising:
a thermoplastic elastomer including at least 80% a propylene component with isotactic crystallinity in which all or substantially all of the substituent groups lie on the same side of the carbon chain; and a polymer selected from one or more of polypropylene, polyethylene, copolymer of propylene, and copolymer of ethylene, wherein the polymer has a melting point that is greater than the melting point of the thermoplastic polymer.

2. A seal as claimed in claim 1, wherein the thermoplastic elastomer comprises a copolymer or terpolymer of propylene and one or more alpha-olefin (s).

3. A seal as claimed in claim 2, wherein the alpha-olefin in the thermoplastic elastomer is selected from one or more of ethylene, butene, hexene, octene and decene.

4. A seal as claimed in claim 1, wherein the propylene component in the thermoplastic elastomer has from 2 to 25% isotactic crystallinity.

5. A seal as claimed in claim 1, wherein the thermoplastic elastomer has a molecular weight (Mw) of at least 100,000.

6. A seal as claimed in claim 1, wherein said polymer increases the peak crystalline melting point of the blend.

7. A seal as claimed in claim 1, wherein said polymer has a molecular weight that is greater than the molecular weight of the thermoplastic elastomer.

8. A seal as claimed in claim 1, wherein said polymer comprises polypropylene.

9. A seal as claimed in claim 8, wherein said polymer comprises a copolymer of polypropylene.

10. A seal as claimed in claim 1, wherein said polymer comprises LDPE or HDPE.

11. A seal as claimed in claim 1, wherein said polymer is present in the blend an amount of from 2 to 30 wt. %.

12. A seal as claimed in claim 1, wherein the seal material comprises an additional thermoplastic component.

13. A seal as claimed in claim 12, wherein the additional thermoplastic component comprises one or more polymers selected from styrene-ethylene-ethylene-propylene, styrene-ethylene-propylene, styrene-butadiene-styrene, polyether block polyamide, polyether-polyester, ethylene-diene, polydimethylsiloxane/urea copolymers, and/or cyclo-olefin copolymers, including combinations of two or more thereof.

14. A seal as claimed in claim 1, wherein the seal material further comprises a mineral and/or inorganic filler.

15. A seal as claimed in claim 14, wherein the filler is clay.

16. A seal as claimed in claim 14, wherein the filler is present in the seal material in an amount of from 1 to 40 wt. %.

17. A seal as claimed in claim 1, wherein the seal material is essentially free of a cross-linking agent.

18. A seal as claimed in claim 1, wherein the seal material is essentially free of a plasticizer.

19. A seal as claimed in claim 1, wherein the seal material is essentially free of a processing aid.

20. A seal as claimed in claim 1, wherein the seal material is essentially free of a compatiblising agent.

21. A valve for use in a pharmaceutical dispensing device having a seal formed from a blend comprising:

a thermoplastic elastomer including at least 80% a propylene component with isotactic crystallinity in which all or substantially all of the substituent groups lie on the same side of the carbon chain; and a polymer selected from one or more of polypropylene, polyethylene, copolymer of propylene, and copolymer of ethylene, wherein the polymer has a melting point that is greater than the melting point of the thermoplastic polymer.

22. A pharmaceutical dispensing device having a valve having a seal formed from a blend comprising:

a thermoplastic elastomer including at least 80% a propylene component with isotactic crystallinity in which all or substantially all of the substituent groups lie on the same side of the carbon chain; and a polymer selected from one or more of polypropylene, polyethylene, copolymer of propylene, and copolymer of ethylene, wherein the polymer has a melting point that is greater than the melting point of the thermoplastic polymer.

23. A pharmaceutical dispensing device as claimed in claim 22 which is a pharmaceutical metered dose aerosol inhaler device.

24. A dispensing apparatus for dispensing pressurised fluid comprising a valve body defining a chamber, a valve member extending movably through the chamber and through at least one annular seal co-operating with the valve member and the body to regulate the discharge of fluid, wherein the at least one annular seal is formed from a blend comprising:

a thermoplastic elastomer including at least 80% a propylene component with isotactic crystallinity in which all or substantially all of the substituent groups lie on the same side of the carbon chain; and a polymer selected from one or more of polypropylene, polyethylene, copolymer of propylene, and copolymer of ethylene, wherein the polymer has a melting point that is greater than the melting point of the thermoplastic polymer.

25. A dispensing apparatus which comprises a pressurised dispensing container having a valve body provided with two annular valve seals through which a valve member is axially slidable, said seals being disposed at inlet and outlet apertures of a valve chamber so that the valve functions as a metering valve, wherein at least one of the annular valve seals is formed from a blend comprising:

a thermoplastic elastomer including at least 80% a propylene component with isotactic crystallinity in which all or substantially all of the substituent groups lie on the same side of the carbon chain; and a polymer selected from one or more of polypropylene, polyethylene, copolymer of propylene, and copolymer of ethylene, wherein the polymer has a melting point that is greater than the melting point of the thermoplastic polymer.

26. A dispensing apparatus as claimed in claim 24, comprising a pressurised dispensing container operatively connected to the valve body and containing the fluid to be dispensed and a hydrofluorocarbon propellant comprising propellant type 134a or 227.

27. A dispensing apparatus as claimed in claim 24, wherein the fluid to be dispensed comprises a liquid or particulate product as a solution or suspension in a carrier liquid comprising alcohol.

28. A dispensing apparatus as claimed in claim 27, wherein the alcohol comprises ethanol.

29. The seal of claim 14 wherein the filler is selected from calcined clays, nano particle clays, talcs and amino-silane-coated clays.

* * * * *